Feb. 14, 1928.
H. D. COLLIER
1,659,019
SYSTEM FOR DISCHARGING LUBRICANTS FROM VEHICLE MOTORS
Original Filed Oct. 11, 1924
Fig.1
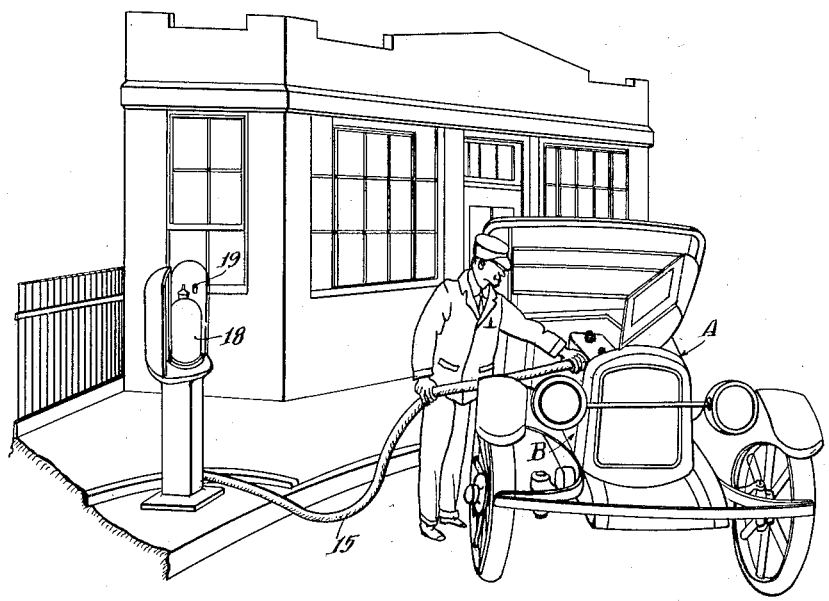
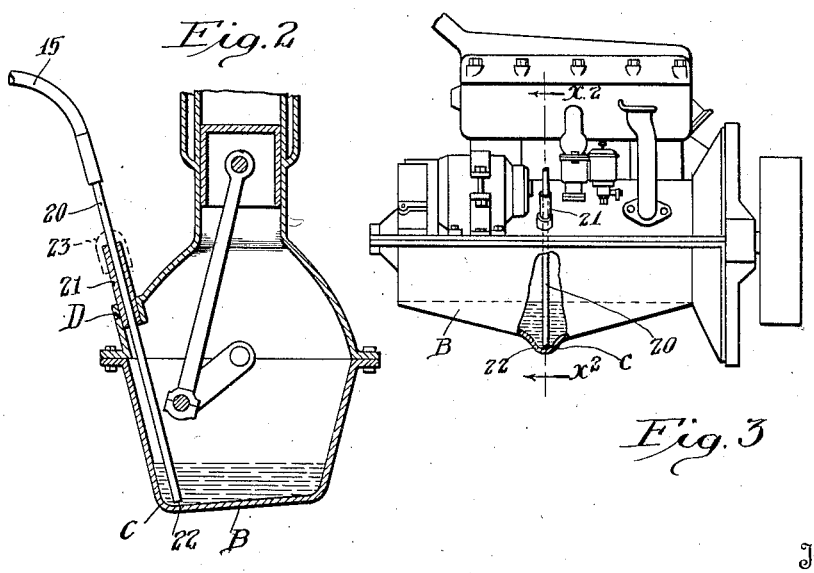
Fig.2
Fig.3
Inventor
Henry D. Collier
By Lyon & Lyon
Attorneys Patented Feb. 14, 1928.

1,659,019

UNITED STATES PATENT OFFICE.

HENRY D. COLLIER, OF SAN FRANCISCO, CALIFORNIA, ASSIGNOR TO STANDARD OIL COMPANY OF CALIFORNIA, OF SAN FRANCISCO, CALIFORNIA, A CORPORATION OF DELAWARE.

SYSTEM FOR DISCHARGING LUBRICANTS FROM VEHICLE MOTORS.

Original application filed October 11, 1924, Serial No. 743,130. Divided and this application filed March 23, 1927. Serial No. 177,579.

This invention relates to a system for discharging lubricant from vehicle motors, and is particularly adapted to provide a convenient method and apparatus for rapidly discharging vehicle motor crank cases.

In United States Letters Patent No. 1,609,697, granted December 7, 1926, there is shown a system and apparatus whereby lubricant may be discharged from vehicle motors quickly and effectively, without the necessity of an operator getting under the car to remove the drain plug, and by which system and apparatus the lubricant is caused to discharge from the lubricant holding case through an eduction tube or hose communicating with the lowest portion of the lubricant holding case. The specific means there illustrated for establishing communication between the eduction tube or hose and the lowest portion of the lubricant holding case comprises a discharge conduit or pipe communicating from the drain port of the lubricant holding case and extending upwardly to a point readily accessible above the high level of the lubricant in the case.

The object of the present invention is to provide a specifically different means for establishing communication between such an eduction tube or hose and the lowermost portion of the lubricant holding case, which means will comprise a member or nozzle mounted on the free end of the eduction tube or hose and adapted to be inserted through a discharge port into the lowermost portion of the case. In a system of this type, it is important to make suitable provision to insure that the lubricant holding case is completely and effectively discharged of lubricant, and for that purpose it is contemplated that the lubricant holding case of the present system shall be shaped to provide a lowermost portion or sump to which the lubricant in the case will drain, and thereby cause the heavy ends and settlings to be discharged with the bulk of the lubricant. To enable the eduction tube to positively and readily communicate with this lowermost portion or sump of the lubricant holding case, it is contemplated that the motor vehicles employed with the present system shall be provided with a convenient discharge port or opening positioned above the high level of the lubricant in the case at a readily accessible point upon raising the motor hood, and in proper alignment with the lowermost portion or sump of the lubricant holding case.

The preferred employment of the present system will include the connection of the eduction tube or hose at one end to a lubricant receiver at a service station, and the provision at the free end of the eduction tube or hose of a nozzle adapted to be readily inserted through the discharge port and into the lowermost portion or sump of the lubricant cases, above referred to, as the vehicles are brought to the service station. A suitable means is provided for creating a reduced pressure in the lubricant receiver to cause lubricant to flow from the vehicle motors through the eduction tube or hose when the system is operatively connected as described. This system enables the lubricant holding cases of vehicle motors to be quickly and readily discharged as the vehicle is driven to the service station and the system connected and operated by the attendant. The present system is adapted particularly to vehicles having lubricant holding cases shaped in the manner described and provided with a discharge port in operative alignment with the lowermost portion of the case, as above described, and avoids the necessity for the provision of a lubricant discharge conduit constituting part of the vehicle as described in the said United States Letters Patent No. 1,609,697. This application is a division of application, Serial No. 743,130, filed October 11, 1924.

The accompanying drawings illustrate a preferred embodiment of the invention.

Figure 1 is a perspective view of a service or filling station equipped with the necessary apparatus embodying the invention, some portions of the apparatus being hidden from view in the station and in the earth. A motor vehicle is shown with the hood raised and the lubricant eduction tube of the system positioned to discharge lubricant from the crank case of the engine.

Figure 2 is a vertical section taken on the line indicated by $X^2$—$X^2$ of Fig. 3, showing the crank case of a motor vehicle illustrating the preferred embodiment of this invention.

Figure 3 is a side elevation of the crank case shown in Fig. 2 with a portion of the side of the crank case broken away.

Referring to Fig. 1 of the drawing, there is provided a lubricant eduction tube or hose 15 for discharging lubricant from the lubricant holding or crank case B of the motor vehicle A. The eduction tube or hose 15 is connected at one end with a lubricant receiver 18 which may be conveniently and attractively mounted at a service station, as illustrated in Fig. 1 of the drawings. By creating a reduced pressure in the lubricant receiver 18, lubricant is drawn from the eduction tube or hose 15 into the lubricant receiver 18. A switch 19 is mounted in the lubricant receiver 18 to control the creation of this reduced pressure. As the present invention relates specifically to the arrangement for connecting the free end of the eduction tube or hose 15 with the lowermost portion or sump of the lubricant holding case on the motor vehicle, no further description will be made here of the means for creating a reduced pressure in the receiver 18, as such means and the means for draining the receiver 18 are fully described in United States Letters Patent No. 1,609,697, aforesaid.

The lubricant holding case B is shaped to provide a lowermost portion or sump C to which the lubricant in the case will drain. A discharge port D is provided at a point on the lubricant holding case B above the lubricant level therein, and preferably at a point readily accessible upon raising the motor hood. This discharge port D is positioned in operative alignment with the lowermost portion or sump C, so that a member inserted through the discharge port D will be directed into the lowermost portion or sump C. The discharge port D may be the breather pipe of the motor case, constructed to provide a sufficient clearance from working parts to permit the end of the eduction tube or hose 15 to extend into the lowermost portion or sump C.

A nozzle 20 is preferably carried at the free end of the eduction tube or hose 15 for insertion into the lubricant case B through the discharge port D. The nozzle 20 is of sufficient length to reach the lowermost portion or sump C without requiring the flexible tube or hose 15 to enter the case. A convenient working arrangement is obtained by providing an exterior smooth surface for the nozzle 20 approximately fifteen inches long and one-half inch in diameter, enabling the nozzle to be readily slidably inserted through a bushing or guide 21 in the opening D of the case B. The end of the nozzle 20 may be notched as at 22 to allow discharge of lubricant into the nozzle when the same contacts at the bottom of the case B. The bushing or guide 21 serves to more readily guide the nozzle to the lowermost portion or sump C of the case B. The discharge port D may be provided with a suitable detachable cap 23.

It will be readily understood from the above that the present invention provides a convenient means of establishing communication between the free end of the eduction tube or flexible hose 15 and the lowermost point or sump C of the lubricant holding case of a motor vehicle, and enables the lubricant to be discharged from the lubricant case rapidly and conveniently, without necessitating the operator getting under the motor vehicle or requiring the employment of a particular discharge conduit embodied in or attached to the lubricant case. In operation, the vehicle may be driven to the service station, equipped with the eduction tube 15 and the lubricant receiver 18, and the operator may insert the nozzle 20 through the discharge port D into the lowermost portion of the crank case or sump C upon merely raising the motor hood. The switch 19 may then be operated to create a reduced pressure in the lubricant receiver 18 and the lubricant will thereupon be discharged from the crank case to the receiver 18. The receiver 18 is preferably transparent and of a size adapted to exhibit the lubricant discharge from an individual vehicle, and is provided with a suitable drainage system, as more specifically described in Patent No. 1,609,697.

A particular advantage of the present invention is that this system serves to completely discharge the contents of the crank case without causing the settlings or residual lubricant to remain in the lubricant holding case. It is well known that a lubricant case must be cleanly discharged, and to accomplish this it is most important to insure the removal of the last portion or dregs of the lubricant. It is contemplated that the present system may require a modification in the construction of the crank cases of motor vehicles, and it is not recommended that this system be employed with motor vehicle lubricant cases which do not have a lowermost portion or sump to which the lubricant will drain, and it is of course not adaptable to vehicle motors in which there is no discharge port aligned with such a lowermost portion or sump and free of parts that would interfere with the insertion of the free end of the eduction tube or nozzle to operative position, as heretofore described.

While the present invention relates specifically to the features and means referred to above, it is not intended to restrict the invention to the details of the arrangement illustrated in the drawings, in so far as such details are susceptible to variation without departing from the advantages and characteristics of the system constituting this invention, and the invention is of the full scope set forth in the following claims.

I claim:—

1. In a system for discharging lubricant from the lubricant holding cases of vehicle motors, a crank case shaped to provide a lowermost portion to which the lubricant in the crank case will drain and provided with a discharge port above the lubricant level and in operative alignment with the said lowermost portion of the crank case, a lubricant eduction tube provided at one end with a portion adapted to be readily inserted through the said discharge port into the lowermost portion of the crank case, and means to create a reduced pressure in the eduction tube to cause the lubricant to discharge from the crank case through the eduction tube.

2. In a system for discharging lubricant from the lubricant holding cases of vehicle motors, a crank case shaped to provide a lowermost portion to which the lubricant in the crank case will drain and provided with a discharge port above the lubricant level and in operative alignment with the lowermost portion of the crank case, a lubricant eduction tube connected at one end to a lubricant receiver and adapted at its opposite end to be inserted through the said discharge port into the lowermost portion of the crank case, and means to create a reduced pressure in the lubricant receiver to cause the lubricant to discharge from the crank case to the lubricant receiver through the eduction tube.

3. In a system for discharging lubricant from the lubricant holding cases of vehicle motors, a crank case shaped to provide a lowermost portion to which the lubricant in the crank case will drain and provided with a discharge port above the lubricant level and in operative alignment with the said lowermost portion of the crank case, a flexible hose connected at one end to a lubricant receiver and provided at its opposite end with a nozzle adapted to be readily inserted through the said discharge port into the lowermost portion of the crank case, and means to create a reduced pressure in the lubricant receiver to cause the lubricant to discharge from the crank case to the lubricant receiver through the flexible hose.

4. In a system for discharging lubricant from the lubricant holding cases of vehicle motors, a crank case having a sump to which the lubricant in the case will drain and a discharge port above the lubricant level and in operative alignment with the sump, a flexible hose connected at one end to a lubricant receiver and provided at its opposite end with a nozzle adapted to be readily inserted through said discharge port into the sump of the crank case, and means to create a reduced pressure in the lubricant receiver to cause the lubricant to discharge from the crank case to the lubricant receiver through the flexible hose.

5. In a system for discharging lubricant from the lubricant holding cases of vehicle motors, a crank case shaped to provide a lowermost portion to which the lubricant in the crank case will drain and provided with a discharge port in operative alignment with the lowermost portion of the crank case and above the lubricant level and readily accessible upon raising the motor hood, a lubricant eduction tube provided at one end with a portion adapted to be readily inserted through the said discharge port into the lowermost portion of the crank case, and means to create a reduced pressure in the eduction tube to cause the lubricant to discharge from the crank case through the eduction tube.

6. In a system for discharging lubricant from the lubricant holding cases of vehicle motors, a crank case having a sump to which the lubricant in the case will drain and a discharge port in operative alignment with the sump and above the lubricant level of the crank case and readily accessible upon raising the motor hood, a flexible hose connected at one end to a lubricant receiver and provided at its opposite end with a nozzle adapted to be readily inserted through said discharge port into the sump of the crank case, and means to create a reduced pressure in the lubricant receiver to cause the lubricant to discharge from the crank case to the lubricant receiver through the flexible hose.

7. In a system for discharging lubricant from vehicle motors, a crank case shaped to provide a lowermost portion to which the lubricant in the crank case will drain and having a discharge port above the lubricant level and in operative alignment with the said lowermost portion of the crank case, a lubricant eduction tube located at a suitable service station and adapted at one end to be readily inserted through the said discharge port into the lowermost portion of the crank case, and means to create a reduced pressure in the eduction tube to cause the lubricant to discharge from the crank case through the eduction tube, whereby lubricant may be quickly discharged from a vehicle motor brought to the service station.

Signed at San Francisco, California, this 16th day of March, 1927.

HENRY D. COLLIER.